(12) United States Patent
Dowling

(10) Patent No.: US 7,353,489 B2
(45) Date of Patent: Apr. 1, 2008

(54) DETERMINING HARDWARE PARAMETERS SPECIFIED WHEN CONFIGURABLE IP IS SYNTHESIZED

(75) Inventor: Hubert H. Dowling, Ennis (IE)

(73) Assignee: SYNOPSYS, Inc., Mountain View, CA (US)

( * ) Notice: Subject to any disclaimer, the term of this patent is extended or adjusted under 35 U.S.C. 154(b) by 245 days.

(21) Appl. No.: 10/856,711

(22) Filed: May 28, 2004

(65) Prior Publication Data

US 2005/0278682 A1    Dec. 15, 2005

(51) Int. Cl.
    *G06F 17/50* (2006.01)
(52) U.S. Cl. .................... 716/18; 716/1; 716/3; 703/14
(58) Field of Classification Search ............... 716/1–3, 716/17, 18; 713/1, 2, 100, 150–193, 300, 713/310; 703/13–23, 26
    See application file for complete search history.

(56) References Cited

U.S. PATENT DOCUMENTS

| | | | | |
|---|---|---|---|---|
| 5,467,472 | A * | 11/1995 | Williams et al. ............... 707/1 |
| 5,517,646 | A |  5/1996 | Piccirillo et al. ............ 395/700 |
| 5,841,663 | A * | 11/1998 | Sharma et al. ................. 716/18 |
| 6,118,938 | A * | 9/2000 | Lawman et al. ............... 716/16 |
| 6,120,549 | A * | 9/2000 | Goslin et al. ................. 703/20 |
| 6,401,230 | B1 * | 6/2002 | Ahanessians et al. .......... 716/1 |
| 6,477,683 | B1 * | 11/2002 | Killian et al. ................... 716/1 |
| 6,757,882 | B2 * | 6/2004 | Chen et al. .................... 716/12 |
| 6,976,239 | B1 * | 12/2005 | Allen et al. .................... 716/16 |
| 7,240,303 | B1 * | 7/2007 | Schubert et al. ............... 716/4 |
| 2003/0009658 | A1 * | 1/2003 | Chen et al. .................. 713/150 |

OTHER PUBLICATIONS

Cordon, B. et al., "Developing Configurable IP for System-on-Chip", 2000 IP World Forum, DesignCon 2000, 16 total pages.

* cited by examiner

*Primary Examiner*—Thuan Do
*Assistant Examiner*—Nghia M. Doan
(74) *Attorney, Agent, or Firm*—Silicon Valley Patent Group LLP; Omkar Suryadevara

(57) ABSTRACT

An attribute of a hardware feature to be customized in a soft core is parameterized so that a value received from a user can be used to generate a description of a circuit containing the customized hardware feature. The generated description also describes, in accordance with the invention, a register that is indicative of the customization. For example, the generated (customized) description may describe the register as containing the value. After the circuit is created, the register may be read (at any time) to identify the customization. Hence, access to such a register eliminates the need for a user to maintain documentation on values specified during customization. Such a register may additionally be used to identify a device driver that is appropriate for use with the customized hardware feature. Additional registers may be included in the generated description, e.g. to identify the function of the circuit, and the version number.

20 Claims, 7 Drawing Sheets

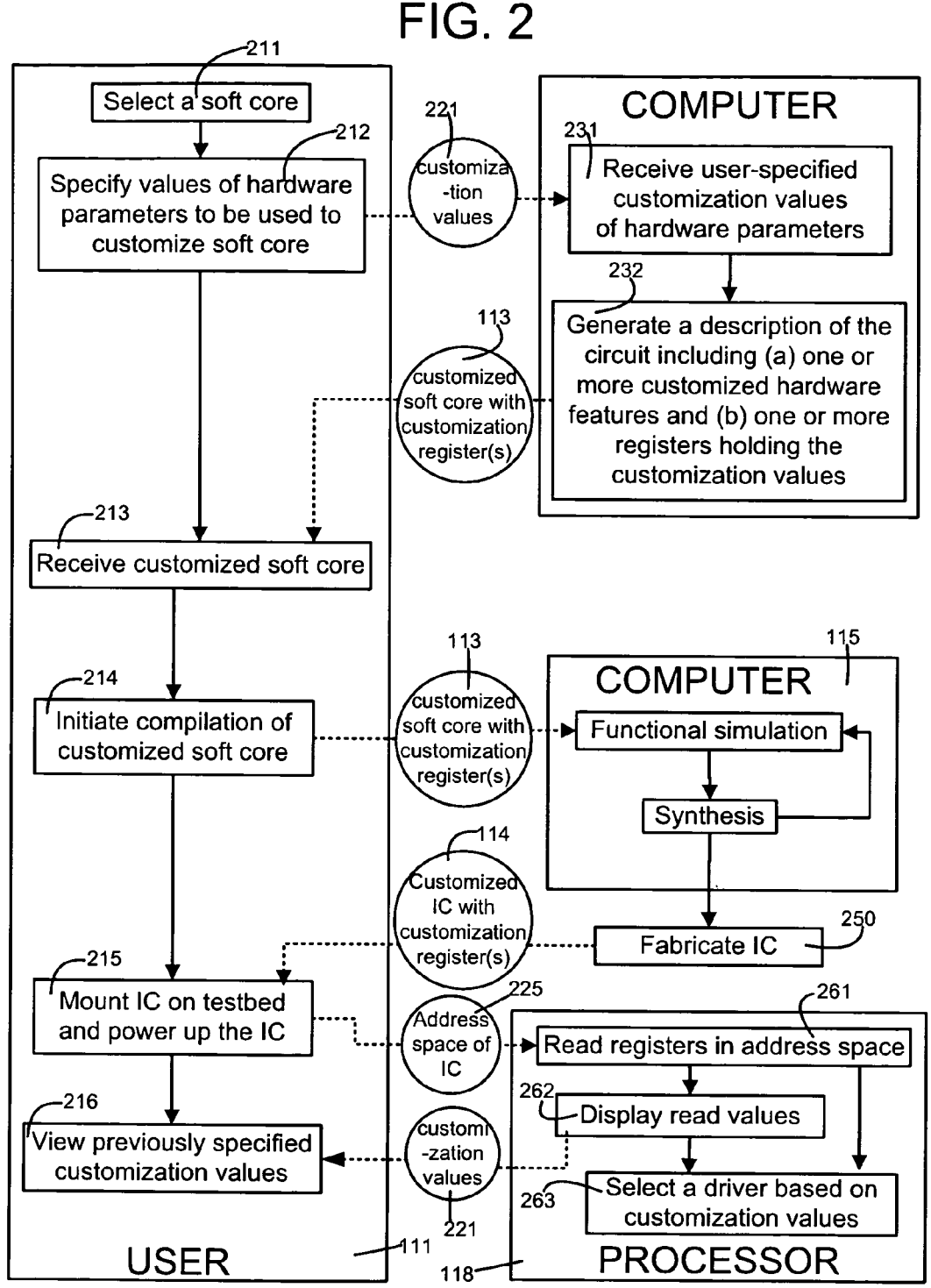

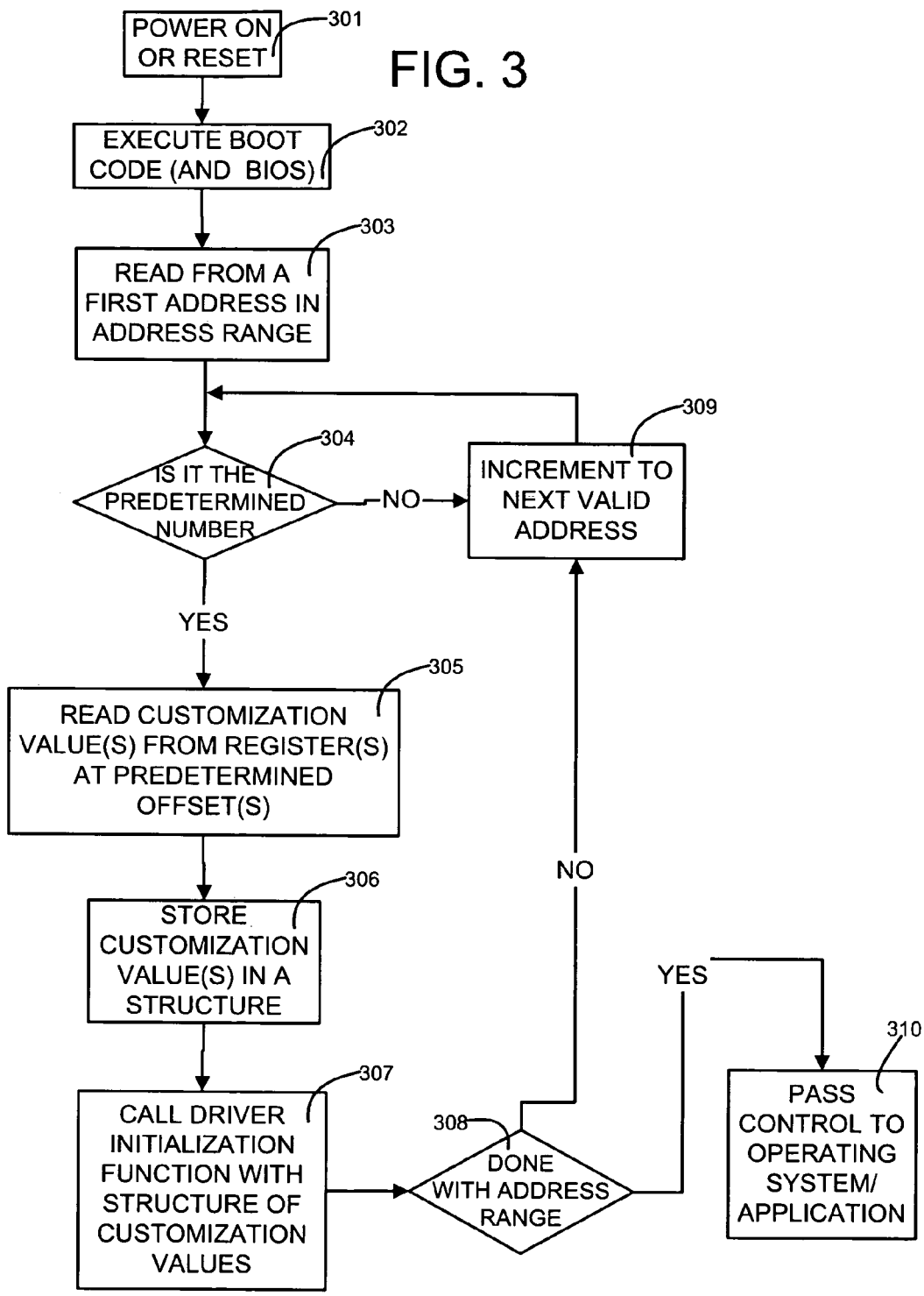

FIG. 4A (prior art)

```
check_lpm.v module check_lpm ( clk, reset, q);
// Port Declaration input   clk;
input   reset;
output  [7:0] q;

lpm_counter u1 (.aclr(reset), .clock(clk), .q(q));
defparam u1.lpm_width= 8;
defparam u1.lpm_direction= "UP";

endmodule
```

```
check_lpm.v reg customization;
customization[0]=WIDTH_16;
customization[1]=DOWN;
reg version;
version = 21;
reg type;
type = COUNTER;

module check_lpm ( clk, reset, q);
// Port Declaration input   clk;
input   reset;
output  [7:0] q;

lpm_counter u1 (.aclr(reset), .clock(clk), .q(q));
defparam u1.lpm_width= 16;
defparam u1.lpm_direction= "DOWN";

endmodule
```

412

411

DETERMINING HARDWARE PARAMETERS SPECIFIED WHEN CONFIGURABLE IP IS SYNTHESIZED

BACKGROUND

1. Field of the Invention

The invention relates to design of semiconductor chips. More specifically, the invention relates to a method and an apparatus for determining from a chip, values of one or more hardware parameters (e.g. FIFO size) that are specified when configurable intellectual property (IP) is synthesized.

2. Related Art

In the past, semiconductor companies used to design a chip and supply the chip design to another company that owns a foundry for fabrication of the chip. Later on, some semiconductor companies began to simply supply intellectual property (IP) in the form of computer files commonly called "core" to chip designers who in turn used the core in their chip design. A chip designer may integrate IP cores for several devices (such as microprocessor, memory, and peripherals) from several vendors into a single design, which is then implemented in a single chip. For this reason, the chip designer is also referred to as "core integrator" which is a different role from a "core designer" who designs the core.

IP cores were initially supplied to chip designers in a physical design form (e.g. transistor level layout such as GDSII) commonly used to manufacture chips. Later, semiconductor companies started to supply IP cores in the form of synthesizable source code (also called "soft cores") which may be in, for example, a Hardware Description Language (HDL) such as Verilog or VHDL. Such soft cores are commonly designed by use of a tool (also called core designer's tool), such as Synopsys' CoreBuilder™. The soft cores are customized by the core integrator, normally via another tool (also called core integrator's tool), such as Synopsys' CoreConsultant™.

Typically, the core designer's tool places constraints on customizations that the core integrator may make to the original soft core. For example, only two options (16 bit and 32 bit registers) may be supported in a specific design of the soft core. The core designer's tool captures such constraints, and may also capture synthesis data, and other core designer knowledge for use in implementation/verification. Such data along with a customized soft core generated by the core integrator's tool is then compiled in synthesis tools (such as Synopsys' Design Compiler®, Test Compiler™, Power Compiler™ or PrimeTime™ software programs) to create a netlist for the user's customized design. The user then implements the netlist in a semiconductor device in the normal manner. For example, the design may be implemented in an FPGA such as XILINX VIRTEX XCV2000 or implemented in an application specific integrated circuit (ASIC) fabricated in a foundry.

After a few iterations of simulation, synthesis, implementation and testing of a design, the user may end up with multiple physical copies of the integrated circuit (IC) being designed. Each copy differs from another copy primarily in the customization done by the user. For example, the user may end up with two copies of a microcontroller, wherein one copy has a 16-bit wide register file containing 32 registers, and another copy has a 32-bit wide register file containing 16 registers (if these values were used during customization).

The inventor of the current patent application has found that when such copies become numerous (i.e. more than a couple), it can be difficult to mentally keep track of which particular copy contains hardware features of which particular values of the customizable parameters. Moreover, the inventor notes that absence of documentation confuses a new user who takes over responsibility for the development work from a user who performed the customizations and now has numerous copies. Similarly, depending on the complexity of the IP, the inventor notes that the provider of the core may want to write a single driver than can transparently be used with all of the allowable configurations by allowing the driver to identify the core and its configuration parameters.

An industry standard for adding expansion cards to personal computers called "Plug and Play" is well known in the art. This standard is commonly used to resolve conflicts that may arise as a result of different resource requirements of the expansion cards. Because all expansion cards respond to the same I/O port address, a unique number (called "serial identifier") composed of two 32-bit fields and an 8-bit checksum is provided on each expansion card. The first 32-bit field is typically the vendor identifier, while the second 32-bit field can be any value, such as the card serial number, as long as the first and second 32-bit fields represent a number that is unique to the expansion card. U.S. Pat. No. 5,517,646, which describes this standard, is incorporated by reference herein in its entirety as background.

SUMMARY

A user selects a desired value for each of one or more hardware parameters that can be customized (i.e. configured) in a soft core. The user-specified values are used by a computer to generate an appropriate description of a circuit containing the hardware feature(s) being customized (e.g. by replacing default values in an original description with user-specified values in the description being generated). The generated description also describes one or more storage units that, in accordance with the invention, hold the user-specified values. For example, in the generated description, a register may be included to hold the user-specified values (either directly or in an encrypted form). When the generated description is used to create a circuit, the just-described register (or other such storage unit, such as a latch) is also created, and may be queried whenever the user-specified values are needed.

Specifically, in accordance with the invention, one or more values stored in such a storage unit may be retrieved, to identify one or more customizations that were done on the original soft core (or even to indicate that no customization was done). When such a storage unit is accessible from outside the circuit, there is no need for a user to manually maintain documentation on the values that were specified during customization. Specifically, use of such a storage unit in accordance with the invention makes each circuit's customization self-documenting, because the customization of each circuit can be retrieved from its own storage unit.

Moreover, in some embodiments, the user-specified customization values that are retrieved from such a storage unit are additionally used (either by themselves or in combination with additional information from additional registers as noted in paragraph) to identify a device driver that is appropriate for the customized hardware feature. Depending on the embodiment, the device driver may be automatically (or manually) selected from among a number of device drivers that may be supplied all together in binary form to the user, by the vendor of the soft core.

Additional registers may be included in the customized description that is generated in some embodiments, e.g. indicative of the version number of the soft core, and indicative of the function of the circuit (e.g. whether the circuit is a universal asynchronous receiver transmitter (UART) device, or a direct memory access (DMA) controller). The values from such additional registers may be used in some embodiments in combination with the user-specified values, to identify the appropriate driver. In several embodiments, all the above-described registers are memory mapped, and there may be at least one more memory mapped register that holds a predetermined number. The predetermined number is used as a flag in some embodiments, to detect the presence of the circuit (and its memory mapped registers) during a scan of an address space containing the circuit.

BRIEF DESCRIPTION OF THE FIGURES

FIG. 2 illustrates, in a high-level flow chart, a method performed by a user (on the left side of the page) and methods performed by computer(s) and data flow therebetween.

FIG. 3 illustrates, in a low-level flow chart, acts performed by the processor of FIG. 2 in some embodiments of the invention.

FIG. 4A illustrates a prior art configurable description of a circuit (also called "soft core").

FIG. 4B illustrates the soft core of FIG. 4A which has been modified in accordance with the invention to include register(s) indicative of customization performed on the soft core.

DETAILED DESCRIPTION

Figure 1A:
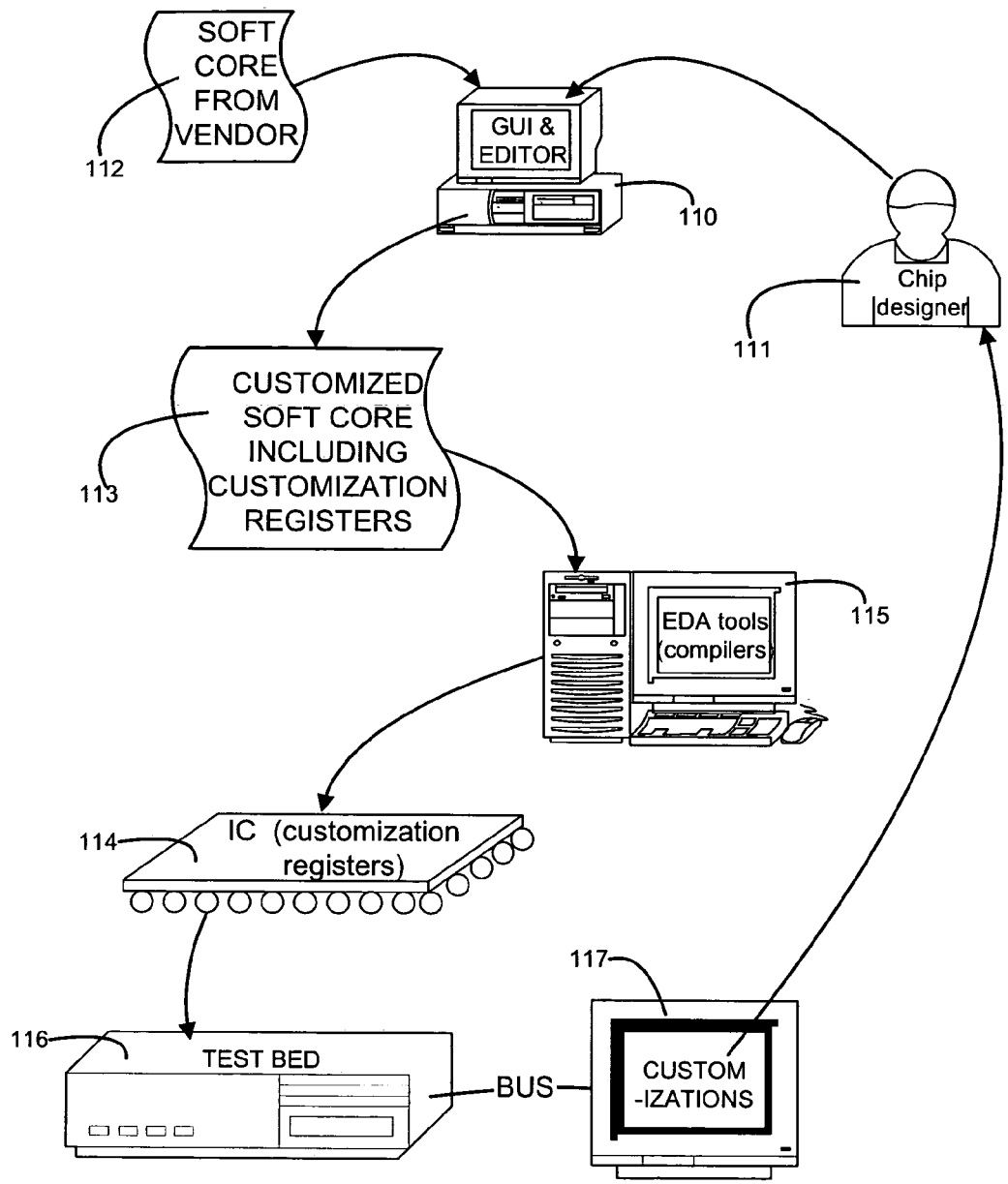
FIG. 1A illustrates, in a high level data flow diagram, generation of customized soft core in accordance with the invention to include customization register(s), and use of the register(s) also in accordance with the invention to identify customizations made by the user at synthesis time.

In several embodiments of the invention, a computer 110 (FIG. 1A) is programmed to receive from a chip designer 111 (also called "user") one or more values of one or more parameters of one or more hardware features to be customized in a soft core 112 (e.g. in the form of a text file that can be edited by a human) that is prepared by a vendor of intellectual property (IP). Note that although a text file is mentioned as an example of the format of soft core, in other examples soft core may be provided in other formats, such as a binary format or a byte code format as long as such format is sufficiently meaningful to a tool supplied to chip designer 111 for customization of the soft core (and an example of such a tool is a GUI as described next). Computer 110 may receive the values to be used in hardware customization via a graphical user interface (GUI), depending on the embodiment. Thereafter, the user-specified values are used by computer 110 to generate (e.g. through an editor) an appropriate description 113 (e.g. also in the form of a text file or binary format or byte code format) describing the customized hardware feature(s). For example, customization may be done by computer 110, by replacing one or more default values that are pre-existing in a generic description in soft core 112, with the corresponding user-specified values in the description 113 that is being generated after customization.

In addition to describing customized hardware, the generated description 113 is prepared, in accordance with the invention, to also describe one or more registers (or other storage units) that hold the user-specified values. For example, in the generated description 113, an additional register (also called "customization register") may be included by computer 110 and described as holding (either directly or in an encrypted form) one or more user-specified values that were used in customizing the hardware. Note that such a customization register is described in description 113 as being accessible from outside the circuit. Next, the generated description 113 is used to create an integrated circuit (IC) 114 in the normal manner, e.g. by use of electronic design automation (EDA) tools, such as a functional simulator, a netlist synthesizer and a programmable logic device (PLD) programmer, one or more of which may be executed in a computer 115.

Note that although two computers 110 and 115 are illustrated in FIG. 1A, other embodiments may use a single computer or more than two computers, as will be apparent to a skilled artisan. Moreover, in some embodiments, computer 110 is at a geographically separate location from computer 115, e.g. computer 110 may be located in the vendor's premises whereas computer 115 may be located in the user's premises. In such embodiments, one or more screens of the graphical user interface (GUI) are transmitted by computer 110 over a communications network between the vendor's premises and the user's premises, and the GUI screens are displayed to the user, e.g. via browser software. Such embodiments eliminate the need for a vendor to disclose their generic soft core to the user.

Next, integrated circuit 114 is installed in a test bed 116 for testing. Thereafter, the above-described customization register are accessed and values stored therein are retrieved and displayed on a monitor 117. Due to the display, it is not necessary for user 111 to manually written down (or otherwise save) the user-specified customization values at the time of providing them to computer 110 (for customization of the soft core). At this stage, if a test does not go as desired, user 111 can review the previously provided customization values and provide different customization values to computer 110 and repeat the above-described process.

In some embodiments, there may be more than one customization register in description 113. The number of customization registers that are used depends on, for example, the customizability of the soft core 112. Specifically, the more customizable soft core 112 is the more number of values need to be saved in a customization register, and the more such registers are needed. On the other hand, if only one parameter of a hardware feature is customizable, and if there are only two options for customization, then only a single bit customization register is needed. The number of hardware parameters that are customizable, and the legal values they can assume are normally determined by the creator (and vendor) of soft core 112. In one particular embodiment, these parameters are manually selected by the core designer, from among the coreKit parameters that are normally produced by the coreBuilder tool available from Synopsys, Inc.

In many embodiments, the customization register is described in description 113 as being memory mapped, meaning that such a register 120 (FIG. 1B) can be directly addressed by a processor 118 to which integrated circuit 114 is coupled by a bus 128 in test bed 116. Making the customization register 120 memory mapped eliminates the need for processor 118 to issue a prior art command query (e.g. as per the SCSI protocol or the CompactFlash protocol), and then parse the response. Instead, the user-specified values are simply read from register 120 by processor 118 placing the appropriate address of this register 120 on bus 128 and driving the read enable line active.

Processor 118 can determine the address from which the data is to be read (i.e. the address of register 120) in any manner well known in the art. For example, user 111 may supply such an address to processor 118. As another example, processor 118 may compute this address by adding (or subtracting) a predetermined offset from another address (also called "flagging address") at which integrated circuit 114 is found to be present during a scan of an address range.

The values read by processor 118 may be used to select a device driver 121J that is appropriate for use with the customized hardware feature(s) in integrated circuit 114. In some embodiments, device driver 121J is automatically selected by processor 118 from among a number of device drivers 121A–121Z that are located in a memory 119 of the electronic device 116. Such automatic selection is performed in some embodiments by use of a look up table 122 in memory 119 that maps each permissible combination of user-specified customization values to an individual one of drivers 121A–121Z.

Automatic selection of a suitable device driver enables a vendor of the soft core to supply to a user a library 121 of drivers in binary form, thereby to enable the vendor to maintain the source code form of these drivers as a trade secret. Note that library 121 of some embodiments contains drivers for all possible combinations of customizations, so that an appropriate driver is automatically selected (regardless of the extent of customization done). Moreover, automatic selection of the suitable driver 121J eliminates manual steps that are otherwise required to find and load the appropriate driver, and hence allows user 111 to test integrated circuit 114 more rapidly than in the prior art. Although automatic selection has been just now described, other embodiments require user 111 to manually read the previously-specified customization values displayed on monitor 117 and then manually find and load the appropriate driver from the vendor-provided library. In such embodiments, memory 119 may not contain look up table 122 and also not contain the remaining drivers 121A and 121Z.

Note that although a look up table 122 is used in some embodiments, other embodiments may use a different mechanism. Furthermore, several embodiments, implement the inverse of what has been described so far. In such embodiments, the peripherals are relatively small and don't have a large number of customization parameters, and hence a single driver is prepared for each, capable of supporting all customizations (also called "IP configurations"), and the driver automatically adjusts its functional behavior dynamically based on the values of the customizations that have been done by user 111.

Note also that although in some embodiments, the user-specified customization values are used by themselves in selecting the appropriate driver 121J, other embodiments use such values in combination with additional information from additional registers as follows. Specifically, in some of the other embodiments, two additional registers are included in customized description 113 (FIG. 1A), one register to indicate the version number of the soft core (e.g. the version number of the RTL of the intellectual property), and another register to indicate a type (also called function) of the circuit (e.g. whether the circuit is a universal asynchronous receiver transmitter (UART) device, or a watchdog timer, or a direct memory access (DMA) controller). Hence, values from such additional registers are used in combination with the user-specified values, to identify the appropriate driver 121J.

Figure 1B:
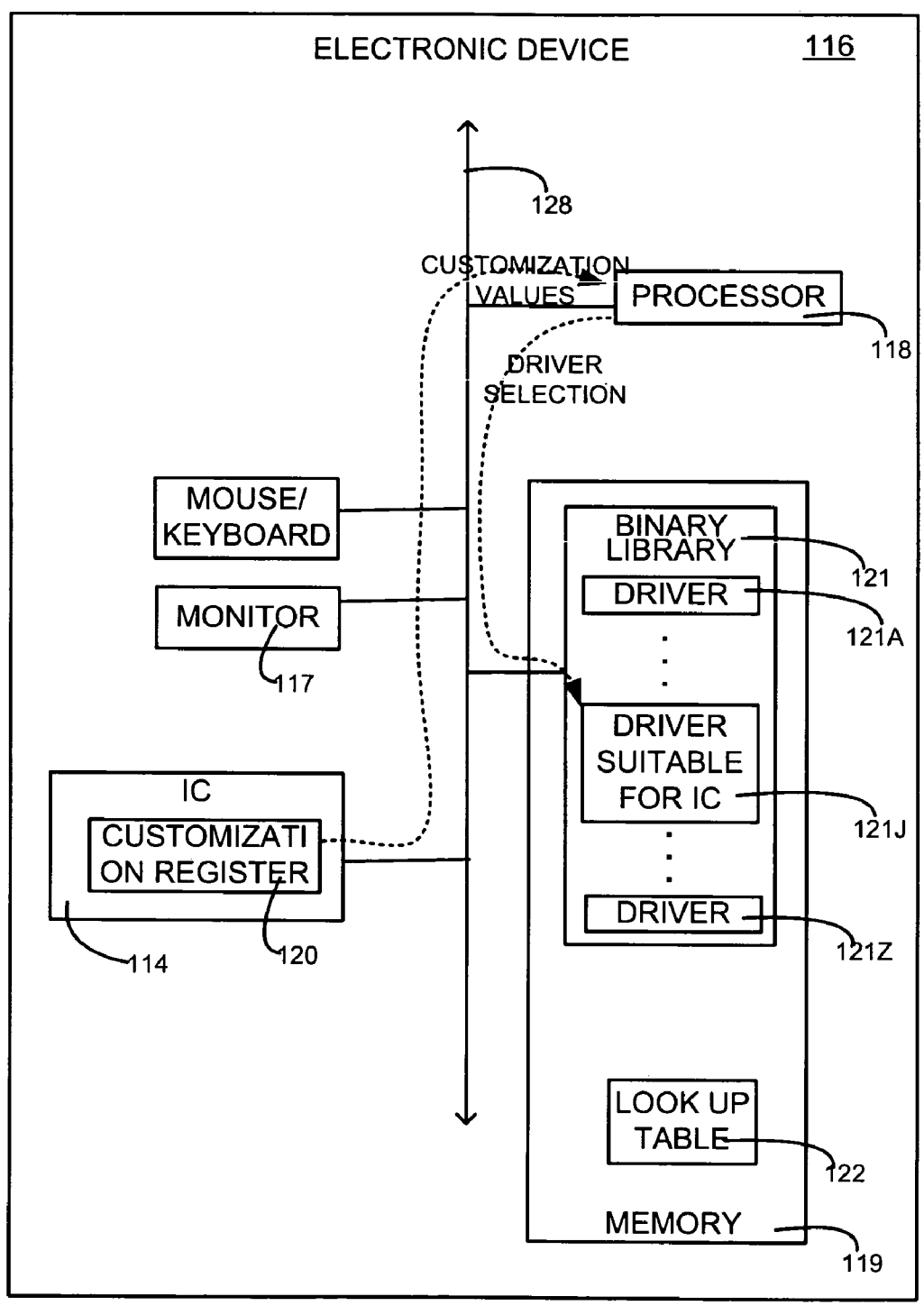
FIG. 1B illustrates, in a block diagram, a processor coupled to and reading customization values from an integrated circuit (IC) of FIG. 1A, and use of the values to select a suitable driver in memory.

Acts that are performed by user 111 and by computers 110 and 115 in some embodiments are illustrated in greater detail in FIG. 2 and are described next. Specifically, in act 211, user 111 initially selects a soft core 112 (FIG. 1A) from among a number of such soft cores that are commonly available in the industry. Thereafter, the user 111 specifies, in act 212, a number of values (also called "customization values") 221 of several hardware parameters that are to be customized in soft core 112. Customization values 221 may be specified via a graphical user interface in computer 110 that receives the values in act 231. Next, in an act 232, computer 110 generates the customized description 113 (FIG. 1A), which includes not only a description of customized hardware features but also a description of the customization registers 120 (FIG. 1B).

User 111 receives the customized description 113 in an act 213, and in act 214 the user provides description 113 to computer 115 and initiates compilation. During compilation, computer 115 performs functional simulation and synthesis iteratively, in the normal manner. Eventually a netlist that is satisfactory to the user 111 is obtained and it is used as per act 250 to fabricate the integrated circuit 114. Note that after synthesis and before fabrication, computer 115 may perform additional acts, such as optimization, place and route, and timing analysis. Also, in act 250, an FPGA, such as XILINX XCV2000E may be programmed using the netlist.

Next, in act 215, the user mounts the integrated circuit 114 on test bed 116 (FIG. 1A), and identifies to processor 118 (FIG. 1B) one or more addresses (e.g. an address space) allocated to integrated circuit 114. Processor 118 is coupled to the integrated circuit 114 by a bus 128 that may be, for example, the industry standard AMBA bus. AMBA stands for "Advanced Module Bus Architecture."

Thereafter, in act 262, processor 118 uses the address(es) to read the customization register(s) 120, as per act 261 Next, processor 118 may either perform act 262 or act 263 or both, depending on the embodiment. In act 262, processor 118 displays the values that have been read from register(s) 120. In this case, user 111 views the previously specified customization values as per act 216. In act 263, processor 118 selects a driver to be used with integrated circuit 114, based on the values read from register(s) 120.

In several embodiments, processor 118 receives an address range in which integrated circuit 114 is present, but the precise address is unknown. In some such embodiments, processor 118 performs the method illustrated in FIG. 3. Specifically, after being powered up or after being reset (see act 301), processor 118 executes the boot code and also the BIOS code (see act 302). Thereafter, processor 118 reads from a first address in the address range (see act 303), and then checks if the value that has been is a predetermined number (see act 304). If the value is not the predetermined number then processor 118 increments its counter to the next valid address in the address range (see act 309) and returns to act 304.

In act 304, if the predetermined number is in fact read from an address (also called "flagging" address) in the address range, then processor 118 reads (as per act 305) one or more values from customization register(s) 120, by addressing a predetermined offset from the address at which the predetermined number is found. As noted above, in addition to the customization register(s), there may be one additional register indicative of version number and another additional register indicative of type, depending on the embodiment. In such embodiments, the additional registers are also read (again by addressing additional predetermined offsets from the flagging address). The additional registers when present, and the customization register are all referred to generically as component identification registers.

In one example, a component identification register that identifies the type is always located at offset 0xFC. Hence, a search through the memory range 0xC0100000 to 0xC01FFFFF is optimized in this example to only read address locations 0XC01000FC, 0xC01001EC, . . . 0xC01FFEFC, and 0xC01FFFFC. Note that in this example, the read value is compared with a predetermined set values for the type, and if there is a match, then a corresponding definition of bit positions and values is used to decode the user-specified values that are then read from the customization register. In one such embodiment, the port map size of integrated circuit 114 is standardized to be a multiple of 0x100 regardless of customization.

Next, processor 118 stores the values that have been read into a data structure (as per act 306), and then calls a driver initialization function (as per act 307) and passes to this function the data structure that has just been assembled. At this stage the driver initialization function performs the table look up (or other such technique) to identify the appropriate driver to be used based on the values in the data structure. Then processor 118 checks (as per act 308) if the address range has been covered, and if not fully covered, returns to incrementing the counter (see act 309). If the address range has been fully covered, then processor 118 passes control to the operating system and/or application (as per act 319).

Note that although FIG. 3 illustrates scanning an address range to find a register containing the predetermined number, thereby to automatically detect one or more integrated circuits 114 that may be present in such an address range, other embodiments may use other techniques. For example, user 111 may simply provide processor 118 with a fixed address at which integrated circuit 114 is located, thereby to eliminate the need to search an address range. However, to do so, user 111 needs to note down the fixed address specified during customization, and then supply this same fixed address when integrated circuit 114 is coupled to processor 118.

Moreover, although FIG. 3 illustrates a specific order for performance of several acts, other embodiments may perform such acts in a different order. For example, act 307 is shown in FIG. 3 as being performed in line, between acts 306 and 308, whereas in an alternative embodiment, act 307 is performed between acts 308 and 310. In the alternative embodiment, an act is performed between acts 306 and 308 to add the structure from act 306 into a linked list which is later used during performance of act 307 (between acts 308 and 310). Note that if there are a number of integrated circuits 114, then there will be a corresponding number of structures in the linked list, and act 307 is repeatedly performed on each of the structures, so that a driver is initialized for each integrated circuit 114.

FIG. 4A illustrates an exemplary soft core 112 for an up/down counter, containing a description 401 of two hardware parameters that may be customized, namely (a) width of the counter and (b) direction of counting. Such counters are well known in the art, e.g. as described the following Internet address (wherein each "-" is to be removed and replaced by a dot and there are no spaces in the address):
www-altera-com/support/examples/verilog/ver_check_lpm.html.

FIG. 4B illustrates description 113 for the same up/down counter shown in FIG. 4A, but wherein the two hardware parameters have been customized as follows (a) width has been increased from the default value of 8 to the customized value of 16 and (b) the direction of counting has been reversed from the default value of "UP" to the customized value of "DOWN". Note that in addition to the customized description 411, description 113 also includes additional description 412 of a customization register.

Note that in the examples illustrated in FIGS. 4A and 4B, certain fixed bit values are predefined, for use as UP (e.g. bit value 0) and DOWN (e.g. bit value 1) instead of the ASCII text strings as shown in FIGS. 4A and 4B. Also, bit 0 of the customization register is shown in description 412 as being set to WIDTH_16 and bit 1 is shown being set to DOWN. Once again, these constants have certain fixed bit values that are predefined. The first three statements in description 412, when used to create an integrated circuit, will result in a register with the predefined bit values in the first and second bit positions thereof indicating the precise customization values that the user has specified.

Note that description 412 includes not only a description of the customization registers, but also a description of at least three additional registers as follows. One register called "version" identifies the version number, another register called "type" identifies the type, and yet another register called "flag" that contains a predetermined number for use during a scan of the address range as noted above (see act 304). In some embodiments there is only one flag register, although in other embodiments there may be any number of flag registers. For example, some embodiments may include ten flag registers (of 32 bit width) in the customized description 113 and the yes branch from decision box 304 is taken only when all ten registers are detected.

In some embodiments, user-specified values stored in the customization registers and version number and type that are stored in the additional registers are all stored unencrypted (i.e. directly) although in other embodiments such data is encrypted. For example, the data may be stored in an encrypted form that is obtained by use of a public key (and the public key may be supplied by user 111 (FIG. 1A) to the graphical user interface in computer 110. In such embodiments, the encrypted data read by processor 118 (FIG. 2B) from the integrated circuit 114 is decrypted by the driver initialization function (see act 307) using a private key (and the private key is included in the binary form of the driver initialization function). Use of an encryption method, such as Pretty Good Privacy (PGP) in the manner just described enables the vendor to reduce the piracy of soft core and driver software.

Regardless of whether encrypted or not, the precise location of the user-specified values in the customization register (e.g. that the lowest bit in this register denotes the direction of counting by the up/down counter), and the meaning of the value itself (e.g. that the value 0 represents counting down) is predetermined by the vendor of soft core 112, and used by each of computer 110 (to store the values) and by processor 118 (to interpret the values).

In some embodiments, the driver initialization function (see act 307) contains several ASCII text strings, each string corresponding to one of the predefined bit patterns, so that an appropriate one of these strings can be displayed to user 111 on monitor 117. In several embodiments, initially, only low-level drivers are being provided in source code form, which exposes this process to user 111. In such embodiments, these versions of the drivers are primarily intended to serve as paragons for programming of configurable IP (also called "soft core"). Other versions of these drivers/peripherals in other embodiments have alternate implementations, possibly employing encryption as detailed here.

Customization registers in some embodiments are added and made addressable from outside of the device at a known offset as follows (in HDL). Note that the registers are on 32-bit boundaries so it is appropriate to drop the lower two bits in the decoder of the address.

```
    assign ic_comp_param_1_en = (reg_addr ==
(`IC_COMP_PARAM_1_OS >> 2));
always @(address_location_at_offset_0 or register_0 or
      address_location_at_offset_1 or register_1 or
      address_location_at_offset_2 or register_2 or
      ic_comp_param_1_en      or ic_comp_param_1
begin
  iprdata = {32{1'b0}};
  case (1'b1)
    address_location_at_offset_0 : iprdata = register_0;
    address_location_at_offset_4 : iprdata = register_1;
    address_location_at_offset_8 : iprdata = register_2;
    ic_comp_param_1_en    : if (`IC_ADD_ENCODED_PARAMS)
            begin
               iprdata = ic_comp_param_1;
            end
  endcase
end
```

In the above code, IC_COMP_PARAM_1_OS is the offset address of the ic_comp_param_1 customization register, ic_comp_param_1_en is a signal which is true when the address of ic_comp_param_1 is detected on the bus accessing the device, registers 0, 1 and 2 are normal registers which form part of the standard device memory map, and iprdata is the value supplied to the bus for a given address (i.e. the value read by the bus for a particular address). Note that IC_ADD_ENCODED_PARAMS is actually a customization parameter, which allows the user to specify whether or not to include the customization register identified by ic_comp_param_1 in the peripheral's memory map. A loose description of the above HDL code is (concerning ourselves only with ic_comp_param_1): Whenever the address of ic_comp_param_1 is detected on the bus, if the user has elected to include it in the customized hardware, return the value of ic_comp_param_1 (which is determined by the user-specified customization parameters as described below).

Customization registers of the type described above are made "read-only" in most embodiments of the invention as shown below:

```
//# The values assigned are fixed once the design is configured, they
//# can not be changed by writing to any locations.
    assign ic_comp_param_1[31:24] = 8'b0;
    assign ic_comp_param_1[23:16] =
`ENCODED_IC_TX_BUFFER_DEPTH;
    assign ic_comp_param_1[15:8] =
`ENCODED_IC_RX_BUFFER_DEPTH;
    assign ic_comp_param_1[7]    =
`IC_ADD_ENCODED_PARAMS;
```

-continued

```
assign ic_comp_param_1[6]   = `IC_HAS_DMA;
assign ic_comp_param_1[5]   = `IC_INTR_IO;
assign ic_comp_param_1[4]   = `IC_HC_COUNT_VALUES;
assign ic_comp_param_1[3:2] = `IC_MAX_SPEED_MODE;
assign ic_comp_param_1[1:0] =
`ENCODED_APB_DATA_WIDTH;
```

The reason these registers are made read only is because these parameters reflect the user's synthesis-time decisions about the implementation of a configurable IP, which cannot be altered in a realization of the device (e.g. in FPGA or ASIC silicon).

Figure 6:
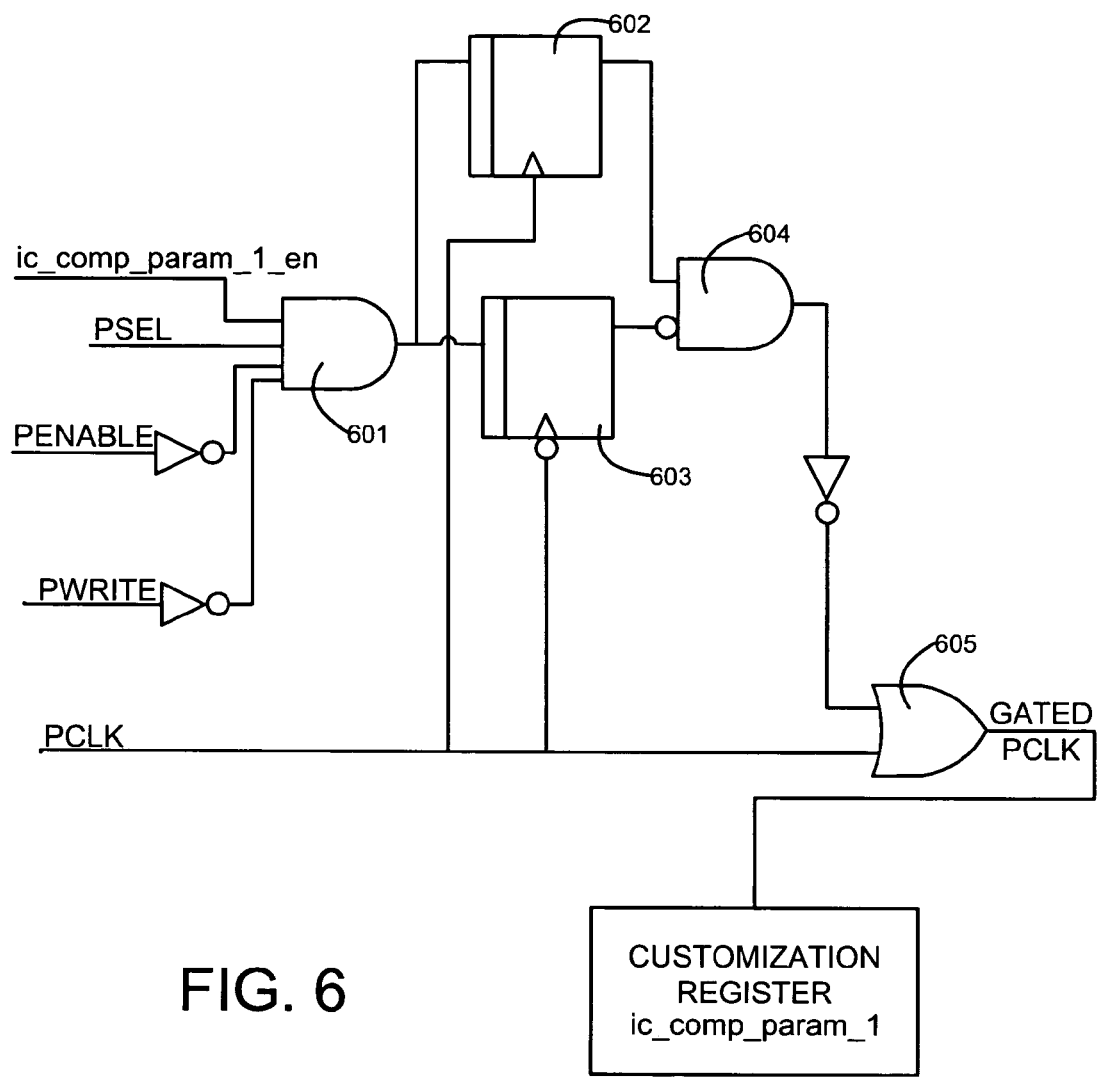
FIG. 6 illustrates a circuit to clock a customization register, only when being accessed, as per some embodiments of the invention.

Note that the HDL code in paragraph 47 above clocks the customization register only when it is being accessed thereby to make it low power. Specifically, as shown above, the clock signal to this register is held high until it is being accessed (i.e. the relevant address select line becoming active). A circuit which performs this operation is shown in FIG. 6. Specifically, as shown in FIG. 6, three signals in a bus that conforms to the AMBA standard, namely the signals PSEL, PENABLE and PWRITE are used as inputs to such a circuit in addition to the signal "ic_comp_param_1_en" and the signal PCLK (which is the clock signal in the AMBA bus). The circuit of FIG. 6 combines signals PSEL and ic_comp_param_1_en and inverted forms of signals PENABLE and PWRITE by use of an AND gate 601, and the output of gate 601 is supplied to the "D" input of two flip-flops 602 and 603. Flip-flop 602 is clocked by PCLK while flip-flop 603 is clocked by an inverted form of PCLK. The Q output of flip-flop 602 and an inverted form of the Q output of flip-flop 603 are combined in an AND gate 604. An inverted form of the output of gate 604 is used as input to an OR gate 605 that also receives PCLK as another input. The output of OR gate 605 is used to clock the customization register identified by ic_comp_param_1.

Figure 5:
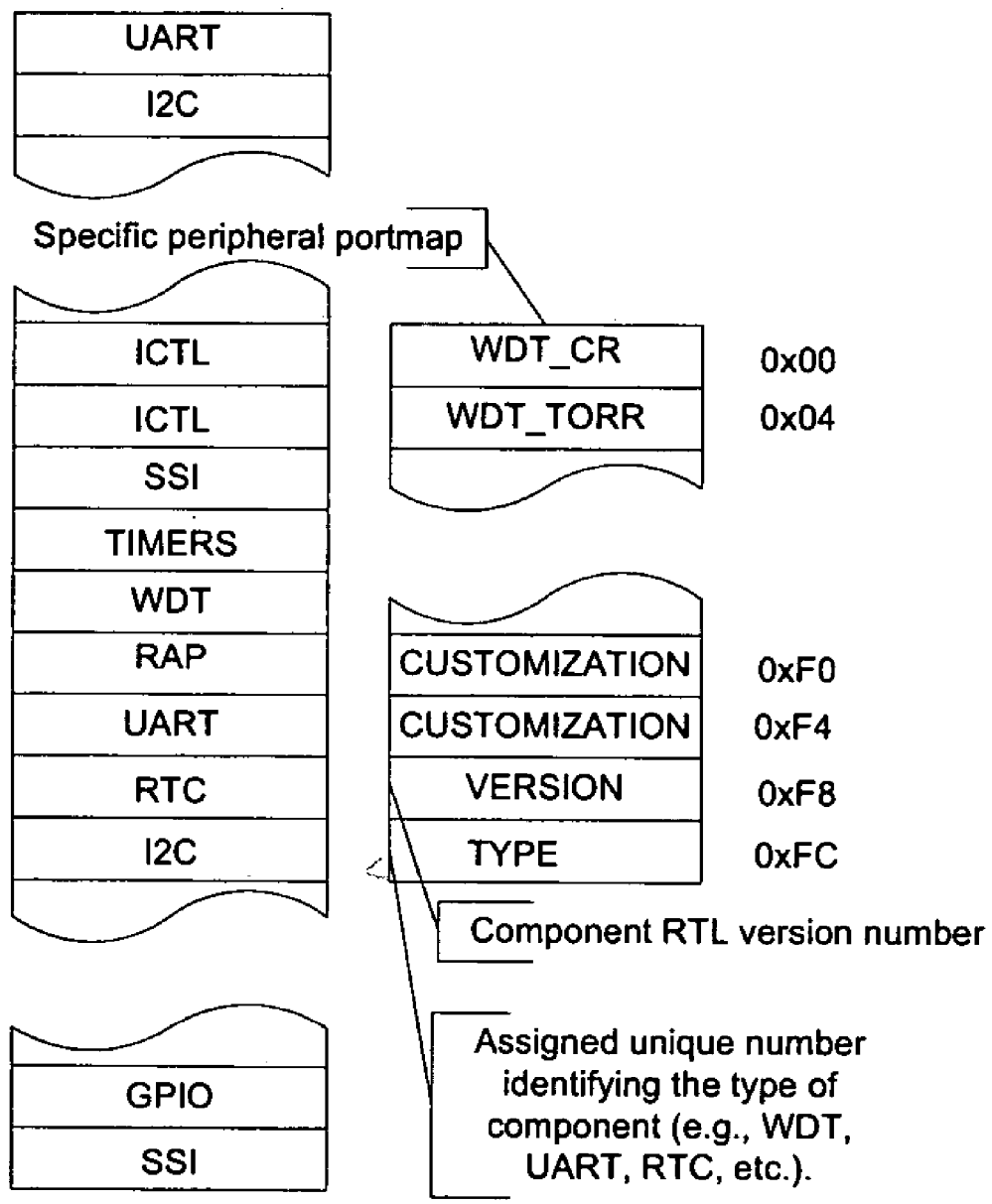
FIG. 5 illustrates an address map and therein a port map identifying two customization registers, a version register and a type register that are included in a customized soft core in some embodiments of the invention.

An address map of one specific embodiment is illustrated in FIG. 5, to contain a number of port maps, include one port map that contains two customization registers, a version register and a type register that are included in a customized description 113.

The foregoing description is presented to enable one to make and use the invention, and is provided in the context of a particular application and its requirements. It is not intended to be exhaustive or to limit the invention to the forms disclosed. Various modifications to the disclosed embodiments will be readily apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. Accordingly, many modifications and variations will be apparent. Numerous such modifications and adaptations of the embodiments and variants described herein are encompassed by the appended claims.

The data structures and code described in this detailed description can be stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet. In one embodiment, the carrier wave includes computer instruction signals for carrying out the process of FIG. 3.

In most embodiments, original soft core 112 that is supplied by the vendor does not contain any description of customization registers, and instead the user's changes to the soft core are used to determine customization registers (and their values) that are inserted into the RTL. In such embodiments, each user-specified value is stored in two locations: (a) in one of the customization registers and (b) in the description of the hardware that is being customized. Thereafter, the user synthesizes the RTL (which may or may not include customization registers, depending on the user's configuration). Hence in such embodiments, it is at synthesis-time that these registers are "created" (i.e. their descriptions are added to the netlist).

The inventor notes that an embedded SoC (system on chip) sometimes includes FPGAs which can be used for numerous things; e.g. extending the life of a fabricated chip by repairing errata through updating the FPGA logic; adding a communications protocol to a chip which didn't exist when it was fabricated, providing reconfigurable functionality, etc. In several embodiments, such a system of reconfigurable IP within an embedded SoC is updated in any manner appropriate after being fabricated in to silicon. At the time of update the above-described customization registers are included in the update, to dynamically adjust a driver's functionality and/or select a new appropriate driver from a list. In some embodiments, this whole process is automated and the SoC after being fabricated into silicon has a network interface and directly accepts FPGA & driver updates (including customization register descriptions and values) in a bit stream format.

Numerous modifications and adaptations of the embodiments described herein will become apparent to the skilled artisan in view of this disclosure. For example, the user need not synthesize the RTL generated by a GUI (of the type described herein) and which RTL contains descriptions of the customization registers and descriptions of the customized hardware. Instead, the user may perform simulation, or any other activity on such RTL prior to synthesis into a netlist. Numerous such modifications and adaptations are encompassed by the attached claims.

The following is a detailed description of one exemplary embodiment of the invention which is based on coreKit parameters that are specified in EDA tools available from Synopsys, Inc. such as the CoreDesigner™, CoreBuilder™, CoreConsultant™ and CoreIntegrator™. The exemplary embodiment described in the next few paragraphs illustrates a definition of customization registers for soft core of peripherals called DesignWare™, such as a watchdog timer, direct memory access (DMA) logic, universal asynchronous receiver transmitter (UART), and a two-wire bus called "I²C".

The crux of this exemplary embodiment is to allow easy and quick identification of DesignWare™ peripherals within an I/O memory region, including which design-time options were selected when the block was synthesized. This exemplary embodiment provides a number of crucial benefits: (a) allows a designer to verify that the options selected during synthesis match what the configuration IDs are reporting, (b) allows a single driver to be developed for each peripheral, which will be self-configurable (i.e. no need to recompile when DesignWare™ parameters are altered), and (c) allows a complete DesignWare™ I/O portmap to be scanned, auto-detecting the available peripherals and initializing the relevant drivers accordingly (especially useful during IP verification and validation).

In the exemplary embodiment, the Configuration ID is used in conjunction with two other 32-bit registers, to allow automatic software detection of any DesignWare peripherals, namely the Peripheral ID and Version ID registers. How these registers are arranged in the I/O port map is shown and described below. Please note that in this paragraph and in the next three paragraphs, customization registers of the type described above are referred to as configuration registers. Also note that not all peripherals need to use the full ten configuration registers specified in the following table.

| I/O Portmap Offset | Register Name |
|---|---|
| Top - 0x04 | Peripheral ID |
| Top - 0x08 | Version |
| Top - 0x0C | Configuration 1 |
| Top - 0x10 | Configuration 2 |
| Top - 0x14 | Configuration 3 |
| Top - 0x18 | Configuration 4 |
| Top - 0x1C | Configuration 5 |
| Top - 0x20 | Configuration 6 |
| Top - 0x24 | Configuration 7 |
| Top - 0x28 | Configuration 8 |

The Peripheral ID register is located at the top of the peripheral's I/O portmap, whose size is a multiple of 0x100. For a peripheral whose portmap size is 0x100, this register is located at 0xfc-0xff. The peripheral ID signifies what, if any, type of peripheral is present. It comprises two ASCII letters "DW", and a 16-bit unsigned number, which identifies the relevant soft core (referred to as the DesignWare™ ID). The Version ID specifies which DesignWare™ release a peripheral is derived from. In selecting the correct software driver or e.g. utilizing knowledge of known errata, appropriate software workarounds are employed. The format of the Version ID is the same as the existing version ID register, which is already being used in AMBA peripherals, e.g. DW_apb_uart.

Moreover, in this exemplary embodiment, all DesignWare™ IP have portmap sizes of multiples of 0x100. This exemplary embodiment also ensures that registers which are located at the top two 32-bit words of each 0x100 byte block (0xf8-0xff) are unaffected by reads (e.g. FIFOs should not be located in this area). This is to facilitate automated software scanning of a complete I/O port map, without adversely affecting the operation of any peripherals. The customization of several peripherals in the exemplary embodiment is now described in the following paragraphs. The following description is meant to be merely illustrative of the invention and is not to be used to limit the scope of the invention.

Registers for a watchdog peripheral in the exemplary embodiment is defined as follows.

Peripheral ID Register:

| Bits | Name | Description |
|---|---|---|
| 31:0 | DesignWare IP Number | 0x44570120 |

For the watchdog timer, a customization register DW_apb_wdt contains the following corekit parameters which affect software:

| | |
|---|---|
| WDT_APB_DATA_WIDTH | 8, 16 or 32 (bits) |
| WDT_ALWAYS_EN | TRUE or FALSE |
| WDT_CNT_RST | 0 to 0xFFFFFFFF |
| WDT_CNT_WIDTH | 16 to 32 (bits) |
| WDT_DFLT_RMOD | TRUE or FALSE |
| WDT_DFLT_RPL | 0 to 7 |
| WDT_DFLT_TOP | 0 to 15 |
| WDT_DFLT_TOP_INIT | 0 to 15 |
| WDT_DUAL_TOP | TRUE or FALSE |
| WDT_HC_RMOD | TRUE or FALSE |
| WDT_HC_RPL | TRUE or FALSE |
| WDT_HC_TOP | TRUE or FALSE |
| WDT_PAUSE | TRUE or FALSE |
| WDT_TOP_RST | 0 to 0xFFFFFFFF |
| WDT_USE_FIX_TOP | TRUE or FALSE |
| WDT_USER_TOP_INIT_(i) | $(2^8 - 1)$ to $(2^{\wedge}WDT\_CNT\_WIDTH - 1)$, where i = 0 to 15 |
| WDT_USER_TOP_(i) | $(2^8 - 1)$ to $(2^{\wedge}WDT\_CNT\_WIDTH - 1)$, where i = 0 to 15 |

For software purposes, only the largest values of both parameters WDT_USER_TOP_(i) and WDT_USER_TOP_INIT_(i) are required.

These values are defined as WDT_USER_TOP_MAX and WDT_USER_TOP_INIT_MAX respectively. Encoding these parameters uses the following number of bits:

| DesignWare Watchdog Parameter | Number of Bits Required |
|---|---|
| WDT_APB_DATA_WIDTH | 2 |
| WDT_ALWAYS_EN | 1 |
| WDT_CNT_WIDTH | 5 |
| WDT_CNT_RST | 32 |
| WDT_DFLT_RMOD | 1 |
| WDT_DFLT_RPL | 3 |
| WDT_DFLT_TOP | 4 |
| WDT_DFLT_TOP_INIT | 4 |
| WDT_DUAL_TOP | 1 |
| WDT_HC_RMOD | 1 |
| WDT_HC_RPL | 1 |
| WDT_HC_TOP | 1 |
| WDT_PAUSE | 1 |
| WDT_TOP_RST | 32 |
| WDT_USE_FIX_TOP | 1 |
| WDT_USER_TOP_INIT_MAX | 32 |
| WDT_USER_TOP_MAX | 32 |
| Total | 154 |

These bits are arranged into three 32-bit registers thus:

Watchdog Configuration Register 1

| Bits | Name | Description |
|---|---|---|
| 31:29 | — | Reserved and read as zero (RAZ) |
| 28:24 | WDT_CNT_WIDTH | 0x00 = 16 bit to 0x10 = 32 bits 0x11–0xff = reserved |
| 23:20 | WDT_DFLT_TOP_INIT | 0x0 = 0 to 0xf = 15 |

-continued

| Bits | Name | Description |
|---|---|---|
| 19:16 | WDT_DFLT_TOP | 0x0 = 0 to 0xf = 15 |
| 15:13 | — | RAZ |
| 12:10 | WDT_DFLT_RPL | 0x0 = 0 to 0x7 = 7 |
| 9:8 | WDT_APB_DATA_WIDTH | 0x0 = 8 bits 0x1 = 16 bits 0x2 = 32 bits 0x3 = reserved |
| 7 | WDT_PAUSE | 0 = FALSE 1 = TRUE |
| 6 | WDT_USE_FIX_TOP | 0 = FALSE 1 = TRUE |
| 5 | WDT_HC_TOP | 0 = FALSE 1 = TRUE |
| 4 | WDT_HC_RPL | 0 = FALSE 1 = TRUE |
| 3 | WDT_HC_RMOD | 0 = FALSE 1 = TRUE |
| 2 | WDT_DUAL_TOP | 0 = FALSE 1 = TRUE |
| 1 | WDT_DFLT_RMOD | 0 = FALSE 1 = TRUE |
| 0 | WDT_ALWAYS_EN | 0 = FALSE 1 = TRUE |

Watchdog Configuration Register 2

| Bits | Name | Description |
|---|---|---|
| 31:0 | WDT_CNT_RST | 0x00000000–0xFFFFFFFF |

Watchdog Configuration Register 3

| Bits | Name | Description |
|---|---|---|
| 31:0 | WDT_TOP_RST | 0x00000000–0xFFFFFFFF |

Watchdog Configuration Register 4

| Bits | Name | Description |
|---|---|---|
| 31:0 | WDT_USER_TOP_INIT_MAX | 0x00000000–0xFFFFFFFF |

Watchdog Configuration Register 5

| Bits | Name | Description |
|---|---|---|
| 31:0 | WDT_USER_TOP_MAX | 0x00000000–0xFFFFFFFF |

Registers for a DMA logic in the exemplary embodiment are defined as follows:

Peripheral ID Register:

| Bits | Name | Description |
|---|---|---|
| 31:0 | DesignWare IP Number | 0x44571110 |

DW_ahb_dmac contains the following coreKit parameters which affect software:

System Parameters

| | |
|---|---|
| DMAH_BIG_ENDIAN | TRUE or FALSE |
| DMAH_INTR_IO | 0, 1 or 2 (ALL, TYPE or COMBINED) |
| DMAH_MABRST | TRUE or FALSE |
| DMAH_M1_HDATA_WIDTH | 32, 64, 128 or 256 (bits) |
| DMAH_M2_HDATA_WIDTH | 32, 64, 128 or 256 (bits) |
| DMAH_M3_HDATA_WIDTH | 32, 64, 128 or 256 (bits) |
| DMAH_M4_HDATA_WIDTH | 32, 64, 128 or 256 (bits) |
| DMAH_NUM_CHANNELS | 1 to 8 |
| DMAH_NUM_HS_INT | 1 to 16 |
| DMAH_NUM_MASTER_INT | 1 to 4 |
| DMAH_S_HDATA_WIDTH | 32, 64, 128 or 256 (bits) |

Per-Channel Parameters (where x=0 to 7)

| | |
|---|---|
| DMAH_CHx_DMS | 0 to 3 (MASTER_1, MASTER_2, MASTER_3, MASTER_4) |
| DMAH_CHx_DST_SCA_EN | TRUE or FALSE |
| DMAH_CHx_DTW | 0, 8, 16, 32, 64, 128, 256 (bytes) |
| DMAH_CHx_FC | 0 to 3 (DMA, SRC, DST or ANY) |
| DMAH_CHx_FIFO_DEPTH | 8, 16, 32 or 64 (bytes) |
| DMAH_CHx_HC_LLP | TRUE or FALSE |
| DMAH_CHx_LMS | 0 to 3 (MASTER_1, MASTER_2, MASTER_3, MASTER_4) |
| DMAH_CHx_LOCK_EN | TRUE or FALSE |
| DMAH_CHx_MAX_BLK_SIZE | 2 to 12 |
| DMAH_CHx_MAX_MULT_SIZE | 4, 8, 16, 32, 64, 128 or 256 (bits) |
| DMAH_CHx_MULTI_BLK_EN | TRUE or FALSE |
| DMAH_CHx_SMS | 0 to 3 (MASTER_1, MASTER_2, MASTER_3, MASTER_4) |
| DMAH_CHx_SRC_GAT_EN | TRUE or FALSE |
| DMAH_CHx_STAT_DST | TRUE or FALSE |
| DMAH_CHx_STAT_SRC | TRUE or FALSE |
| DMAH_CHx_STW | 0, 8, 16, 32, 64, 128, 256 (bytes) |

Encoding these parameters requires the following number of bits:

| DesignWare DMA Parameter | Number of Bits Required |
|---|---|
| DMAH_BIG_ENDIAN | 1 |
| DMAH_INTR_IO | 2 |
| DMAH_MABRST | 1 |
| DMAH_M1_HDATA_WIDTH | 2 |
| DMAH_M2_HDATA_WIDTH | 2 |
| DMAH_M3_HDATA_WIDTH | 2 |
| DMAH_M4_HDATA_WIDTH | 2 |
| DMAH_NUM_CHANNELS | 3 |
| DMAH_NUM_HS_INT | 4 |
| DMAH_NUM_MASTER_INT | 2 |
| DMAH_S_HDATA_WIDTH | 2 |
| DMAH_CHx_FC | 2 * 8 = 16 |
| DMAH_CHx_FIFO_DEPTH | 2 * 8 = 16 |
| DMAH_CHx_HC_LLP | 1 * 8 = 8 |
| DMAH_CHx_LMS | 2 * 8 = 16 |
| DMAH_CHx_LOCK_EN | 1 * 8 = 8 |
| DMAH_CHx_MAX_BLK_SIZE | 4 * 8 = 32 |
| DMAH_CHx_MAX_MULT_SIZE | 3 * 8 = 24 |
| DMAH_CHx_MULTI_BLK_EN | 1 * 8 = 8 |
| DMAH_CHx_SMS | 2 * 8 = 16 |
| DMAH_CHx_SRC_GAT_EN | 1 * 8 = 8 |
| DMAH_CHx_STAT_DST | 1 * 8 = 8 |
| DMAH_CHx_STAT_SRC | 1 * 8 = 8 |
| DMAH_CHx_STW | 3 * 8 = 24 |
| Total (24 bits per channel + 23) | 215 |

DMA Configuration Register1

| Bits | Name | Description |
|---|---|---|
| 31:23 | — | RAZ |
| 22:21 | DMAH_M4_HDATA_WIDTH | 0x0 = 32 bits<br>0x1 = 64 bits<br>0x2 = 128 bits<br>0x3 = 256 bits |
| 20:19 | DMAH_M3_HDATA_WIDTH | 0x0 = 32 bits<br>0x1 = 64 bits<br>0x2 = 128 bits<br>0x3 = 256 bits |
| 18:17 | DMAH_M2_HDATA_WIDTH | 0x0 = 32 bits<br>0x1 = 64 bits<br>0x2 = 128 bits<br>0x3 = 256 bits |
| 16:15 | DMAH_M1_HDATA_WIDTH | 0x0 = 32 bits<br>0x1 = 64 bits<br>0x2 = 128 bits<br>0x3 = 256 bits |
| 14:13 | DMAH_S_HDATA_WIDTH | 0x0 = 32 bits<br>0x1 = 64 bits<br>0x2 = 128 bits<br>0x3 = 256 bits |
| 12:11 | DMAH_NUM_MASTER_INT | 0x0 = 1 to 0x3 = 4 |
| 10:8 | DMAH_NUM_CHANNELS | 0x0 = 1 to 0x7 = 8 |
| 7:4 | DMAH_NUM_HS_INT | 0x0 = 1 to 0xf = 16 |
| 3 | DMAH_MABRST | 0 = FALSE<br>1 = TRUE |
| 2:1 | DMAH_INTR_IO | 0x0 = ALL<br>0x1 = TYPE<br>0x2 = COMBINED<br>0x3 = reserved |
| 0 | DMAH_BIG_ENDIAN | 0 = FALSE<br>1 = TRUE |

DMA Configuration Registers 2–9 (Channels 0–7)

| Bits | Name | Description |
|---|---|---|
| 31:23 | — | RAZ |
| 22:21 | DMAH_CHx_FC | 0x0 = DMA |

-continued

| Bits | Name | Description |
|---|---|---|
| | | 0x1 = SRC |
| | | 0x2 = DST |
| | | 0x3 = ANY |
| 20:19 | DMAH_CHx_FIFO_DEPTH | 0x0 = 8 |
| | | 0x1 = 16 |
| | | 0x2 = 32 |
| | | 0x3 = 64 |
| 18 | DMAH_CHx_HC_LLP | 0 = FALSE |
| | | 1 = TRUE |
| 17:15 | DMAH_CHx_LMS | 0x0 = MASTER_1 |
| | | 0x1 = MASTER_2 |
| | | 0x2 = MASTER_3 |
| | | 0x3 = MASTER_4 |
| 16 | DMAH_CHx_LOCK_EN | 0 = FALSE |
| | | 1 = TRUE |
| 15:12 | DMAH_CHx_MAX_BLK_SIZE | 0x0–0x1 = reserved |
| | | 0x2 = 2 |
| | | to |
| | | 0xc = 12 |
| | | 0xd–0xf = reserved |
| 11:9 | DMAH_CHx_MAX_MULT_SIZE | 0x0 = 4 |
| | | 0x1 = 8 |
| | | 0x2 = 16 |
| | | 0x3 = 32 |
| | | 0x4 = 64 |
| | | 0x5 = 128 |
| | | 0x6 = 256 |
| | | 0x7 = reserved |
| 8 | DMAH_CHx_MULTI_BLK_EN | 0 = FALSE |
| | | 1 = TRUE |
| 7:6 | DMAH_CHx_SMS | 0x0 = MASTER_1 |
| | | 0x1 = MASTER_2 |
| | | 0x2 = MASTER_3 |
| | | 0x3 = MASTER_4 |
| 5 | DMAH_CHx_SRC_GAT_EN | 0 = FALSE |
| | | 1 = TRUE |
| 4 | DMAH_CHx_STAT_DST | 0 = FALSE |
| | | 1 = TRUE |
| 3 | DMAH_CHx_STAT_SRC | 0 = FALSE |
| | | 1 = TRUE |
| 2:0 | DMAH_CHx_STW | 0x0 = 0 |
| | | 0x1 = 8 |
| | | 0x2 = 16 |
| | | 0x3 = 32 |
| | | 0x4 = 64 |
| | | 0x5 = 128 |
| | | 0x6 = 256 |
| | | 0x7 = reserved |

Registers for a UART in the exemplary embodiment are defined as follows.

Peripheral ID Register

| Bits | Name | Description |
|---|---|---|
| 31:0 | DesignWare IP Number | 0x44570110 |

DW_apb_uart contains the following coreKit parameters which affect software (note: all these parameters are prepended with "UART_"):

| | |
|---|---|
| AFCE_MODE | TRUE or FALSE |
| APB_DATA_WIDTH | 8, 16 or 32 (bits) |
| CLK_GATE_EN | TRUE or FALSE |
| DMA_EXTRA | TRUE or FALSE |
| FIFO_ACCESS | TRUE or FALSE |

-continued

| | |
|---|---|
| FIFO_MODE | 0, 16, 32, ... 2048 (bytes deep) |
| FIFO_STAT | TRUE or FALSE |
| SHADOW | TRUE or FALSE |
| SIR_MODE | TRUE or FALSE |
| SIR_LP_MODE | TRUE or FALSE |
| THRE_MODE | TRUE or FALSE |

Encoding these parameters requires the following number of bits:

| DesignWare UART Parameter | Number of Bits Required |
|---|---|
| AFCE_MODE | 1 |
| APB_DATA_WIDTH | 2 |
| CLK_GATE_EN | 1 |
| DMA_EXTRA | 1 |
| FIFO_ACCESS | 1 |
| FIFO_MODE | 8 |
| FIFO_STAT | 1 |
| SHADOW | 1 |
| SIR_MODE | 1 |
| SIR_LP_MODE | 1 |
| THRE_MODE | 1 |
| Total | 19 |

UART Configuration Register

| Bits | Name | Description |
|---|---|---|
| 31:24 | — | RAZ |
| 23:16 | FIFO_MODE | 0x00 = 0 |
| | | 0x01 = 16 |
| | | 0x02 = 32 |
| | | to |
| | | 0x80 = 2048 |
| | | 0x81–0xFF = reserved |
| 15:11 | — | RAZ |
| 10:9 | APB_DATA_WIDTH | 0x0 = 8 bits |
| | | 0x1 = 16 bits |
| | | 0x2 = 32 bits |
| | | 0x3 = reserved |
| 8 | AFCE_MODE | 0 = FALSE |
| | | 1 = TRUE |
| 7 | CLK_GATE_EN | 0 = FALSE |
| | | 1 = TRUE |
| 6 | DMA_EXTRA | 0 = FALSE |
| | | 1 = TRUE |
| 5 | FIFO_ACCESS | 0 = FALSE |
| | | 1 = TRUE |
| 4 | FIFO_STAT | 0 = FALSE |
| | | 1 = TRUE |
| 3 | SHADOW | 0 = FALSE |
| | | 1 = TRUE |
| 2 | SIR_MODE | 0 = FALSE |
| | | 1 = TRUE |
| 1 | SIR_LP_MODE | 0 = FALSE |
| | | 1 = TRUE |
| 0 | THRE_MODE | 0 = FALSE |
| | | 1 = TRUE |

Registers for an I²C bus interface in a peripheral device in exemplary embodiment are defined as follows.

Peripheral ID Register

| Bits | Name | Description |
|---|---|---|
| 31:0 | Peripheral IP Number | 0x44570140 |

DW_apb_i2c contains the following corekit parameters which affect software (note: all these parameters are prepended with IC_):

| | |
|---|---|
| APB_DATA_WIDTH | 8, 16 or 32 (bits) |
| APB_ID | 0 to $((2^{32}) - 1)$ |
| CLOCK_PERIOD | 2 to $((2^{32}) - 1)$ |
| DEFAULT_SLAVE_ADDR | 0 to $((2^{10}) - 1)$ |
| FS_SCL_HIGH_COUNT | 0 to $((2^{16}) - 1)$ |
| FS_SCL_LOW_COUNT | 0 to $((2^{16}) - 1)$ |
| HC_COUNT_VALUES | TRUE or FALSE |
| HS_MASTER_CODE | 1 to 7 |
| HS_SCL_HIGH_COUNT | 0 to $((2^{16}) - 1)$ |
| HS_SCL_LOW_COUNT | 0 to $((2^{16}) - 1)$ |
| IC_HAS_DMA | TRUE or FALSE |
| INTR_IO | INDIVIDUAL or COMBINED |
| MASTER_MODE | TRUE or FALSE |
| MAX_SPEED_MODE | STANDARD, FAST or HIGH |
| RESTART_EN | TRUE or FALSE |
| RX_BUFFER_DEPTH | 2 to $2^8$ |
| RX_TL | 0 to (RX_BUFFER_DEPTH − 1) |
| SS_SCL_HIGH_COUNT | 0 to $((2^{16}) - 1)$ |
| SS_SCL_LOW_COUNT | 0 to $((2^{16}) - 1)$ |
| TX_BUFFER_DEPTH | 2 to $2^8$ |
| TX_TL | 0 to (TX_BUFFER_DEPTH − 1) |
| USE_COUNTS | TRUE or FALSE |
| 10BITADDR_MASTER | TRUE or FALSE |
| 10BITADDR_SLAVE | TRUE or FALSE |

Encoding these parameters requires the following number of bits:

| DesignWare I2C Parameter | Number of Bits Required |
|---|---|
| APB_DATA_WIDTH | 2 |
| APB_ID | 32 |
| CLOCK_PERIOD | 32 |
| DEFAULT_SLAVE_ADDR | 10 |
| FS_SCL_HIGH_COUNT | 16 |
| FS_SCL_LOW_COUNT | 16 |
| HC_COUNT_VALUES | 1 |
| HS_MASTER_CODE | 3 |
| HS_SCL_HIGH_COUNT | 16 |
| HS_SCL_LOW_COUNT | 16 |
| IC_HAS_DMA | 1 |
| INTR_IO | 1 |
| MASTER_MODE | 1 |
| MAX_SPEED_MODE | 2 |
| RESTART_EN | 1 |
| RX_BUFFER_DEPTH | 8 |
| RX_TL | 8 |
| SS_SCL_HIGH_COUNT | 16 |
| SS_SCL_LOW_COUNT | 16 |
| TX_BUFFER_DEPTH | 8 |
| TX_TL | 8 |
| USE_COUNTS | 1 |
| 10BITADDR_MASTER | 1 |
| 10BITADDR_SLAVE | 1 |
| Total | 217 |

I2C Configuration Register 1

| Bits | Name | Description |
|---|---|---|
| 31:26 | — | RAZ |
| 25:16 | DEFAULT_SLAVE_ADDR | 0x000 to 0x3FF |
| 15 | — | RAZ |
| 14 | IC_HAS_DMA | 0 = FALSE<br>1 = TRUE |
| 13 | 10BITADDR_SLAVE | 0 = FALSE<br>1 = TRUE |
| 12 | 10BITADDR_MASTER | 0 = FALSE<br>1 = TRUE |
| 11 | USE_COUNTS | 0 = FALSE<br>1 = TRUE |
| 10 | RESTART_EN | 0 = FALSE<br>1 = TRUE |
| 9:8 | MAX_SPEED_MODE | 0x0 = STANDARD<br>0x1 = FAST<br>0x2 = HIGH<br>0x3 = reserved |
| 7:5 | HS_MASTER_CODE | 0x0 = reserved<br>0x1 = 1<br>to<br>0x7 = 7 |
| 4 | MASTER_MODE | 0 = FALSE<br>1 = TRUE |
| 3 | INTR_IO | 0 = INDIVIDUAL<br>1 = COMBINED |
| 2 | HC_COUNT_VALUES | 0 = FALSE<br>1 = TRUE |
| 1:0 | APB_DATA_WIDTH | 0x0 = 8 bits<br>0x1 = 16 bits<br>0x2 = 32 bits<br>0x3 = reserved |

I2C Configuration Register 2

| Bits | Name | Description |
|---|---|---|
| 31:0 | APB ID | 0x00000000 to 0xFFFFFFFF |

I2C Configuration Register 3

| Bits | Name | Description |
|---|---|---|
| 31:0 | CLOCK_PERIOD | 0x00000000 to 0xFFFFFFFF |

I2C Configuration Register 4

| Bits | Name | Description |
|---|---|---|
| 31:24 | TX_TL | 0x00 = 0<br>to<br>0xFF = 255<br>(must be <= TX_BUFFER_DEPTH) |
| 23:16 | TX_BUFFER_DEPTH | 0x00 = reserved<br>0x01 = 2<br>0x02 = 3 |

-continued

| Bits | Name | Description |
|---|---|---|
| 15:8 | RX_TL | to<br>0xFF = 256<br>0x00 = 0<br>to<br>0xFF = 255<br>(must be <= RX_BUFFER_DEPTH) |
| 7:0 | RX_BUFFER_DEPTH | 0x00 = reserved<br>0x01 = 2<br>0x02 = 3<br>to<br>0xFF = 256 |

I2C Configuration Register 5

| Bits | Name | Description |
|---|---|---|
| 31:16 | SS_SCL_HIGH_COUNT | 0x0000 to 0xFFFF |
| 15:0 | SS_SCL_LOW_COUNT | 0x0000 to 0xFFFF |

I2C Configuration Register 6

| Bits | Name | Description |
|---|---|---|
| 31:16 | FS_SCL_HIGH_COUNT | 0x0000 to 0xFFFF |
| 15:0 | FS_SCL_LOW_COUNT | 0x0000 to 0xFFFF |

I2C Configuration Register 7

| Bits | Name | Description |
|---|---|---|
| 31:16 | HS_SCL_HIGH_COUNT | 0x0000 to 0xFFFF |
| 15:0 | HS_SCL_LOW_COUNT | 0x0000 to 0xFFFF |

What is claimed is:

1. A method of identifying and using hardware features of a circuit, the method comprising:
   receiving from a user a value of a type of a hardware feature to be customized in a description to be generated of said circuit;
   receiving from said user additional values of additional types of additional hardware features to be customized in the circuit;
   including in said description said additional hardware features customized to have said additional types of said additional values;
   including in said description a storage unit and additional storage units accessible from a bus outside the circuit;
   synthesizing said description of said circuit, said circuit comprising said hardware feature customized to have said type of said value and said additional hardware features customized to have said additional types of said additional values;
   fabricating a chip comprising said circuit, based on a netlist resulting from said synthesizing of said description;
   retrieving said value and said additional values from said storage unit and said additional storage units in said chip via said bus after fabrication of said chip; and
   selecting a driver to be executed by a processor in using said hardware feature and said additional hardware features, based on said value read from said storage unit and said additional values read from said additional storage units;
   wherein said driver comprises a set of instructions in binary form.

2. The method of claim 1 further comprising:
   supplying to said user, said plurality of sets of instructions in binary form;
   wherein said selecting is performed automatically by additional instructions included in said binary form.

3. The method of claim 1 further comprising: displaying on a display device, said value obtained by said retrieving.

4. The method of claim 1 wherein:
   the storage unit comprises a register that is memory mapped;
   said value is held in said register; and
   said retrieving comprises placing an address of the register on an address bus coupled to the circuit and thereafter receiving said value from a data bus coupled to the circuit.

5. The method of claim 1 further comprising:
   prior to said retrieving, looking for a predetermined number at a plurality of locations in a predetermined address range and on finding a register at an address containing said predetermined number, determining said address as being at a predetermined offset relative to another address.

6. The method of claim 1 further comprising:
   reading an identifier of the user from a register in said circuit; and
   checking if said identifier exists in a database of licensees.

7. The method of claim 1 wherein:
   the description describes clocking the storage unit only during said retrieving.

8. The method of claim 1 further comprising:
   performing functional simulation of said circuit, using the description.

9. The method of claim 1 wherein said value is held in said storage unit in an encrypted form obtained by use of a public key, and wherein said encrypted form of said value is obtained by said retrieving, and the method further comprises:
   using a private key to decrypt said encrypted form of said value.

10. The method of claim 1 further comprising:
    displaying a graphical user interface (GUI), wherein said value is received through said GUI; and
    using an editor prior to said synthesizing, wherein said description is expressed by said editor as a text file containing instructions in a hardware description language (HDL), and wherein a generic version of said description is input to said editor, said generic version comprising a default value for said type.

11. The method of claim 1 further comprising including in said description:
    yet another storage unit accessible from outside the circuit and containing a predetermined version number of an original source code for the description; and still another storage unit accessible from outside the circuit and containing a predetermined number.

12. The method of claim 1 wherein:

said value is a result of a synthesis-time decision made by said user about implementation of a configurable IP; and said storage unit in said circuit is read only.

13. The method of claim 1, the method further comprising:

displaying on a monitor said value obtained from said storage unit.

14. A computer readable storage medium carrying instructions that when executed by a computer cause the computer to perform a method of identifying hardware features of a circuit, the method comprising:

receiving from a user a value of a type of a hardware feature to be customized in a description to be generated of said circuit;

receiving from said user additional values of additional types of additional hardware features to be customized in the circuit;

including in said description said additional hardware features customized to have said additional types of said additional values;

including in said description a storage unit and additional storage units accessible from a bus outside the circuit;

synthesizing said description of said circuit, said circuit comprising said hardware feature customized to have said type of said value and said additional hardware features customized to have said additional types of said additional values;

creating a chip comprising said circuit, using a netlist resulting from said synthesizing of said description;

retrieving said value and said additional values from said storage unit and said additional storage units in said chip via said bus after creation of said chip; and selecting a driver to be executed by a processor in using said hardware feature and said additional hardware features, based on said value read from said storage unit and said additional values read from said additional storage units;

wherein said driver comprises a set of instructions in binary form.

15. The computer readable storage medium of claim 14, wherein:

the description describes clocking the storage unit only during said retrieving.

16. The computer readable storage medium of claim 14, wherein the method further comprises:

performing functional simulation of said circuit, using the description.

17. The computer readable storage medium of claim 14 wherein:

said value is a result of a synthesis-time decision made by said user about implementation of a configurable IP; and said storage unit in said circuit is read only.

18. A method of identifying and using hardware features of a circuit, the method comprising:

receiving from a user a value of a type of a hardware feature to be customized in a description to be generated of said circuit;

including in said description a storage unit to be accessible from a bus outside said circuit;

synthesizing said description of said circuit, said circuit comprising said hardware feature customized to have said type of said value;

fabricating a chip comprising said circuit, based on at least a result of said synthesizing of said description;

retrieving said value from said storage unit in said chip via said bus after fabrication of said chip;

using said value obtained from said storage unit, to identify a set of instructions to be executed by a processor in using said hardware feature customized to have said type of said value, from among a plurality of sets of instructions;

receiving from said user additional values of additional types of additional hardware features to be customized in the circuit; and including in said description, said additional hardware features customized to have said additional types of said additional values, and including in said description additional storage units accessible from outside the circuit and containing said additional values.

19. The method of claim 18 wherein:

said set of instructions comprise a driver, and said plurality of sets of instructions comprise a plurality of drivers, and at least one of said drivers is in binary form.

20. The method of claim 18 further comprising:

displaying on a display device, said value obtained by said retrieving.

* * * * *